Nov. 7, 1944.  W. S. MASON  2,362,286
PISTON RING
Filed Aug. 11, 1942
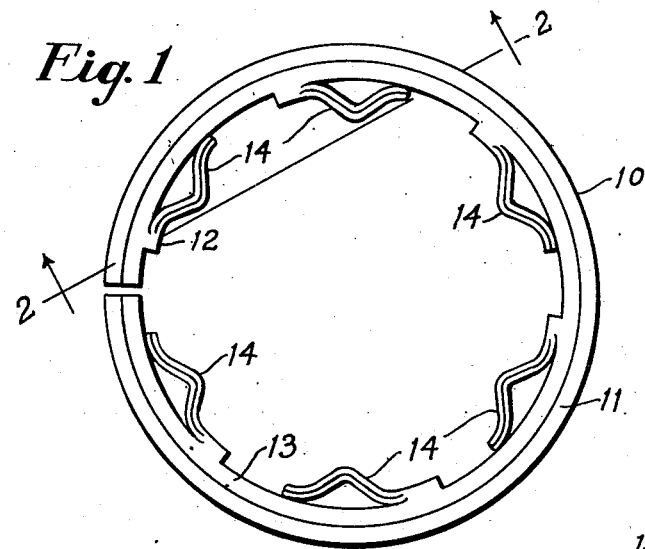
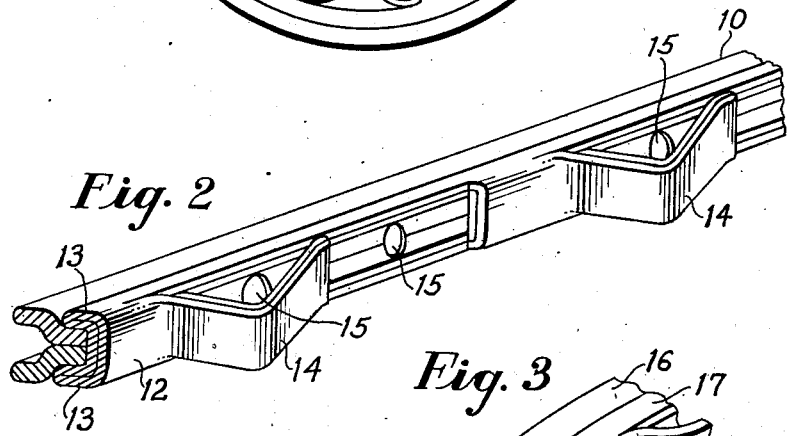
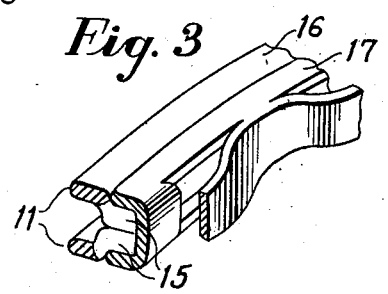
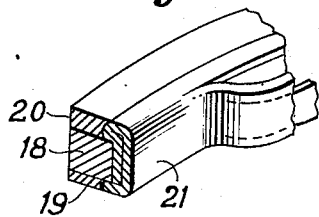
Inventor
William S. Mason Patented Nov. 7, 1944

2,362,286

UNITED STATES PATENT OFFICE 2,362,286

PISTON RING

William S. Mason, Norfolk, Va.

Application August 11, 1942, Serial No. 454,363

5 Claims. (Cl. 309—45)

This invention relates to piston rings, and is a continuation in part of my copending application Ser. No. 428,403 filed January 27, 1942, for Piston ring expanders.

One object of my invention is to provide a packing ring which will provide effective oil scraping and receiving means so as to prevent an excess of oil getting into the combustion chamber, wherein it produces carbon, fouls spark plugs, and overheats the engine.

Another object is to provide a piston ring expander which will permit free oil drainage between the wall of the cylinder and the drain ducts in the bottom of the groove in the piston for excess oil scraped off of the cylinder wall by the piston rings.

Another object is to provide a simple effective packing which will be relatively light in weight, cheap to manufacture, easy to install and responsive to cylinder irregularities such as may occur due to wear during use of the engine.

Still further objects and advantages will be brought out in the following description and claims wherein they will be more readily understood when read in conjunction with the accompanying drawing, in which:

Figure 1 is a top view of a packing constructed according to the present invention;

Figure 2 is a fragmentary perspective view of the inner periphery of the ring shown in Figure 1, along the lines 2—2, looking in the direction of the arrows;

Figure 3 and 4 are fragmentary perspective views of modifications.

The packing 10, shown in Figure 1, comprises piston rings 11, and expander ring 12. The piston rings are formed and arranged to provide recesses adjacent to their inner peripheral edges and the side walls of a groove in a piston and to seal said side walls outwardly thereof. The expander ring comprises a pair of supporting flanges 13, disposed in the recesses, and with radially expansible spring fingers 14. The spring fingers seat on the bottom of the piston ring groove and urge the flanges and piston rings outwardly and away from the piston. The spring fingers may be utilized to supplement the radial expansibility of the piston rings, or to provide all of the necessary cylinder wall sealing and scraping pressure, whereby the piston rings may be made of material which will best meet the requirements of the engine as to wear, heat conductivity, etc. The piston rings are provided with oil drainage slots 15, which permit free oil drainage to the drain ducts in the bottom of the groove in the piston.

In the packing 16, shown in Figure 3, the inner marginal portions of the piston rings has been made thicker to provide larger oil drainage slots. The outer marginal portion has been made relatively thin to provide a larger oil receiving channel between the rings and the wall of the cylinder. The flanges of the expander ring 17, prevent the piston rings from being thrown away from the side walls of the groove and twisting therein, also provide an additional heat path for the spring fingers. By sealing the side walls outwardly of the flanges the piston rings prevent them from overheating due to exposure to the direct heat of combustion. The piston rings like those shown in Figures 1 and 2 are more fully disclosed in my Patent No. 2,202,802, dated May 28, 1940.

The packing shown in Figure 4, is constructed for use in a top groove of a piston, so the spacer ring 18, and the piston rings 19 and 20, are formed and arranged to be in substantially full peripheral contact with the cylinder wall. The expander ring 21, having only one flange laminated makes possible the use of piston rings of different thickness, and the flanges or rings can be made of such radial depth that either of the piston rings will receive the initial radial pressure from the expander ring, preferably this would be the thinner ring which would be made of soft metal to provide a quick wearing in surface and also reduce the running in time and decrease the chances of cylinder scoring. The thicker ring would be placed adjacent to upper groove side wall as it would have less tendency to overheat, also it may be made of harder longer wearing metal to increase the useful life of the packing. When the packing is used as an oil control ring in a groove provided with drain ducts, a slotted spacer ring or a corrugated expander ring would be substituted for the spacer ring shown so as to provide free oil drainage to the drain ducts.

I claim:

1. For use in a cylinder in combination with a reciprocating piston provided with a packing ring groove having upper and lower side walls, a packing comprising a plurality of superposed rings and an expander ring, said rings being formed and arranged to seal said side walls and to provide recesses adjacent to their inner peripheral edges and said side walls and said expander ring having outwardly and radially extending flanges disposed in said recesses and provided with radially expansible spring fingers adapted to urge said flanges and said piston rings outwardly and radially away from the bottom of the groove in said piston.

2. For use in a cylinder in combination with a reciprocating piston provided with a packing ring groove having upper and lower side walls, a packing comprising a pair of relatively thin split superposed piston rings and an expander ring, said piston rings having inner and outer peripheral edges axially offset and being arranged to form recesses adjacent to their inner peripheral edges and the side walls of the groove and to seal said side walls outwardly thereof and said expander having flanges disposed in said recesses and provided with spring fingers adapted to urge said rings and flanges outwardly and radially away from the bottom of the groove in said piston.

3. For use in a cylinder in combination with a reciprocating piston provided with a packing ring groove having upper and lower side walls, a packing comprising a plurality of piston rings and a piston ring expander comprising a pair of outwardly and radially extending supporting flanges provided with radially expansible spring fingers, said piston rings being formed and arranged to provide recesses adjacent to their inner peripheral edges and said upper and lower side walls and to seal the side walls outwardly of the recesses, said flanges comprising the upper and lower edges of said expander ring and being disposed in said recesses and said spring fingers being adapted to urge said flanges and certain at least of said piston rings outwardly and away from the bottom of the groove in said piston.

4. For use in a cylinder in combination with a reciprocating piston provided with a packing ring groove having upper and lower side walls, a packing comprising a pair of superposed piston rings, an interposed spacer ring and a piston ring expander, said piston rings and spacer ring being formed and arranged to provide recesses adjacent to their inner peripheral edges and said side walls and the piston rings being adapted to seal the side walls outwardly of the recesses and said expander ring having outwardly and radially extending flanges disposed in said recesses and provided with radially expansible spring fingers adapted to urge said flanges and at least one of said piston rings outwardly and away from the bottom of the groove in said piston.

5. A piston ring expander comprising an elongated strip of resilient metal doubled upon itself longitudinally with its medial portion forming one edge of the expander and the remainder of the strip forming the sides and having radially expansible spring fingers formed therein.

WILLIAM S. MASON.